US010821867B2

(12) United States Patent
Okubo et al.

(10) Patent No.: US 10,821,867 B2
(45) Date of Patent: Nov. 3, 2020

(54) HEADREST SUPPORT DEVICE

(71) Applicant: TS TECH CO., LTD., Saitama (JP)

(72) Inventors: Takuya Okubo, Tochigi (JP); Takayuki Inose, Tochigi (JP); Masaki Nonaka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/507,196

(22) Filed: Jul. 10, 2019

(65) Prior Publication Data

US 2019/0329687 A1 Oct. 31, 2019

Related U.S. Application Data

(63) Continuation of application No. 15/749,849, filed as application No. PCT/JP2016/003613 on Aug. 4, 2016, now Pat. No. 10,391,907.

(30) Foreign Application Priority Data

Aug. 4, 2015 (JP) ................... 2015-154057

(51) Int. Cl.
*B60N 2/80* (2018.01)
*B60N 2/806* (2018.01)
(Continued)

(52) U.S. Cl.
CPC ............... *B60N 2/806* (2018.02); *B60N 2/80* (2018.02); *B60N 2/832* (2018.02); *B60N 2/856* (2018.02); *B60N 2/874* (2018.02)

(58) Field of Classification Search
CPC .......... B60N 2/806; B60N 2/80; B60N 2/856; B60N 2/832; B60N 2/874
See application file for complete search history.

(56) References Cited

U.S. PATENT DOCUMENTS

| 5,011,225 A | 4/1991 | Nemoto |
| 6,050,633 A | 4/2000 | Droual |

(Continued)

FOREIGN PATENT DOCUMENTS

| JP | S61160752 | 10/1986 |
| JP | 5038735 | 10/2012 |

(Continued)

OTHER PUBLICATIONS

International Search Report for PCT/JP2016/003613 dated Oct. 21, 2016, 4 pages.

*Primary Examiner* — Syed A Islam

(74) *Attorney, Agent, or Firm* — Dority & Manning, P.A.

(57) ABSTRACT

Provided is a simple and compact headrest support device. The headrest support device (20) comprises a support member (22) coupled to a frame (2) of a seatback (1), and a headrest pillar structure including a pillar base portion (25) extending laterally and supported by the support member so as to be rotatable around an axial line of the pillar base portion, and a pair of pillar main body portions (26) extending substantially vertically from the pillar base portion substantially in parallel to each other in a laterally spaced apart relationship and connected to a headrest (24), wherein the support member is coupled to the frame at at least one coupling portion (34) disposed between the two pillar main body portions in front view in a headrest upright condition where the headrest is positioned above the seatback.

10 Claims, 6 Drawing Sheets

(51) Int. Cl.
    *B60N 2/832* (2018.01)
    *B60N 2/874* (2018.01)
    *B60N 2/856* (2018.01)

(56) References Cited

U.S. PATENT DOCUMENTS

| | | | |
|---|---|---|---|
| 6,935,696 B2 | 8/2005 | Gauthier et al. | |
| 7,237,843 B2 | 7/2007 | Clark et al. | |
| 7,341,312 B2* | 3/2008 | Gauthier | A47C 1/10 |
| | | | 297/408 |
| 7,484,796 B2 | 2/2009 | Fischer et al. | |
| 7,575,282 B2 | 8/2009 | Sutter et al. | |
| 7,673,938 B2 | 3/2010 | Yamaguchi et al. | |
| 7,717,516 B2 | 5/2010 | Sutter et al. | |
| 8,002,356 B2* | 8/2011 | Lutzka | B60N 2/844 |
| | | | 297/408 |
| 8,066,330 B2* | 11/2011 | Keller | B60N 2/856 |
| | | | 297/408 |
| 8,172,330 B2 | 5/2012 | Sayama | |
| 8,465,098 B2* | 6/2013 | Yetukuri | B60N 2/856 |
| | | | 297/408 |
| 8,998,333 B2* | 4/2015 | Hage-Hassan | B60N 2/80 |
| | | | 297/391 |
| 9,145,079 B2* | 9/2015 | Fredriksson | B60N 2/859 |
| 9,663,002 B2* | 5/2017 | Lee | B60N 2/874 |
| 9,980,570 B2* | 5/2018 | Jeong | B60N 2/841 |
| 10,427,572 B2* | 10/2019 | Jeong | B60N 2/80 |
| 2006/0163930 A1 | 7/2006 | Pettersson et al. | |
| 2013/0134761 A1* | 5/2013 | Willard | B60N 2/856 |
| | | | 297/408 |
| 2014/0015296 A1* | 1/2014 | Ogata | B60N 2/366 |
| | | | 297/340 |
| 2014/0070586 A1* | 3/2014 | Tachikawa | B60N 2/206 |
| | | | 297/340 |
| 2015/0015048 A1* | 1/2015 | Kapusky | B60N 2/844 |
| | | | 297/408 |
| 2015/0266402 A1 | 9/2015 | Lutzka | |
| 2018/0072202 A1* | 3/2018 | Kumazaki | B60N 2/682 |
| 2019/0118687 A1* | 4/2019 | Jeong | B60N 2/856 |

FOREIGN PATENT DOCUMENTS

| | | |
|---|---|---|
| JP | 2012214128 | 11/2012 |
| WO | WO2015088175 | 6/2015 |

* cited by examiner

HEADREST SUPPORT DEVICE

CROSS REFERENCE TO RELATED APPLICATIONS

This application is a continuation of U.S. patent application Ser. No. 15/749,849, having a filing date of Feb. 2, 2018, which is the U.S. National Stage entry of International Application Number PCT/JP2016/003613 filed under the Patent Cooperation Treaty having a filing date of Aug. 4, 2016, which claims priority to Japanese Patent Application Number 2015-154057 having a filing date of Aug. 4, 2015, which are incorporated herein by reference.

TECHNICAL FIELD

The present invention relates to a headrest support device, and in particular to a headrest support device that allows a headrest to be angularly adjusted relative to a seatback.

BACKGROUND ART

A known headrest support device for a vehicle seat supports a headrest so as to be angularly adjusted relative to a seatback (see Patent Document 1, for example). The headrest support device disclosed in Patent Document 1 includes a pillar structure including a pair of right and left leg portions having lower ends coupled to a seatback and a horizontal rod portion connected between the upper ends of the leg portions, a main frame rotatably supported by the horizontal rod portion, and a cover material that covers the main frame. The headrest is completed by covering the cover material with a pad material and a skin member.

PRIOR ART DOCUMENT(S)

Patent Document(s)

Patent Document 1: JP5038735B

SUMMARY OF THE INVENTION

Task to be Accomplished by the Invention

In the headrest support device disclosed in Patent Document 1, since the main frame is formed by joining two metal plate members by crimping or the like, a special tool is required for assembly. In addition, since a latch plate provided on the horizontal rod portion for selectively securing the main frame to the pillar structure protrudes out of the main frame, the cover material is required to cover both the main frame and the latch plate. Therefore, the headrest support device requires a large number of component parts, tends to be complex in structure, and is inevitably large in size.

The present invention was made in view of such problems of the prior art, and has a primary object to provide a headrest support device which is simple in structure, and compact in size.

Means for Accomplishing the Task

To achieve such an object, the present invention provides a headrest support device (20) comprising: a support member (22) coupled to a frame (2) of a seatback (1); and a headrest pillar structure including a pillar base portion (25) extending laterally and supported by the support member so as to be rotatable around an axial line of the pillar base portion, and a pair of pillar main body portions (26) extending substantially vertically from the pillar base portion substantially in parallel to each other in a laterally spaced apart relationship and connected to a headrest (24); wherein the support member is coupled to the frame at at least one coupling portion (34) disposed between the two pillar main body portions in front view in a headrest upright condition where the headrest is positioned above the seatback.

According to this aspect of the present invention, since the at least one coupling portion is disposed in a space surrounded by the headrest pillar structure in a headrest use position in front view, the support member and the headrest pillar structure can be arranged compactly, and the size of the headrest support device can be minimized.

Preferably, the coupling portion includes a first coupling portion (34) disposed between the two pillar main body portions and above the pillar base portion in front view in the headrest upright condition, and a second coupling portion (35) positioned below the pillar base portion.

According to this aspect, since the support member is coupled to the frame at the first coupling portion and the second coupling portion interposing the pillar base portion with respect to the vertical direction, the headrest support device can be supported on the frame in a stable manner.

Preferably, the frame includes a pair of side frames (3) located on either side, a first upper frame (4) connected between upper ends of the side frames, and a second upper frame (5) connected between parts of the side frames located below the first upper frame; and the support member is connected to the first upper frame at the first coupling portion, and to the second upper frame at the second coupling portion.

According to this aspect, since the vertical distance between the first coupling portion and the second coupling portion can be maximized, the headrest support device can be supported on the flame in a highly stable manner.

Preferably, the first upper frame includes a frame main body (4A) and a pair of first brackets (7) extending vertically from the frame main body in a mutually laterally spaced apart relationship, and the support member is secured to the first brackets at a pair of third coupling portions (36) located in a mutually laterally spaced apart relationship and under the pillar base portion in an upright condition of the seatback.

According to this aspect, since the third coupling portions are further provided at positions closer to the pillar base portion than the second coupling portion, the headrest support device can be supported on the frame in a particularly stable manner.

Preferably, the headrest support device further comprises a pillar side locking member (50) fixedly attached to the pillar base portion, and a support member side locking member (60) moveably attached to the support member to selectively engage the pillar side locking member to fix a relative angle between the headrest pillar structure and the support member, wherein the first coupling portion includes a pair of first coupling portions positioned in a mutually laterally spaced apart relationship, and the pillar side locking member is positioned laterally between the two first coupling portions.

According to this aspect, since the first coupling portions are disposed on either side of the pillar side locking member, or, in other words, on either side of a part where the load is transmitted from the headrest pillar structure to the support member, the headrest support device can be supported on the frame in a highly stable manner.

Preferably, the first upper frame is provided with a second bracket (11) connected to the first brackets and extending upward relative to the frame main body, and the first coupling portions are connected to the second bracket, an abutting portion (95) being formed on an outer surface of the support member opposing the pillar base portion for a surface contact with an outer surface of the first upper frame.

According to this aspect, since the support member is coupled to the first upper frame via the first bracket or the second bracket at the first coupling portion and the third coupling portions, and the support member abuts the first upper frame at the abutting portion that corresponds to the pillar base portion, the headrest support device can be supported on the frame in a stable manner.

Preferably, the second coupling portion is positioned on a vertical line passing through the pillar side locking member in front view.

According to this aspect, the second coupling portion can support a load applied by the pillar side locking member onto the support member in an efficient manner.

Preferably, the support member side locking member is rotatably supported by the support member via a shaft member, and the support member is provided on an outer surface thereof with reinforcing ribs extending vertically and laterally around the shaft member.

According to this aspect, since the part of the support member surrounding the shaft member to which the load from the headrest pillar structure is applied via the pillar side locking member and the support member side locking member is reinforced by the reinforcing ribs, deformation of the support member is minimized. In particular, since the reinforcing ribs include those extending vertically, the load from the headrest pillar structure is efficiently transmitted to the first and second upper frames.

Preferably, the support member includes a first member and a second member that are joined to each other, and the first member, the second member and the frame are jointly fastened to one another at at least one of the first coupling portion (83), the second coupling portion (85) and the third coupling portions (87).

According to this aspect, the number of bolts required for fastening the first member and the second member to each other and fastening the support member to the frame can be minimized.

Effect of the Invention

According to the foregoing structure, a headrest support device which is simple in structure and compact in size can be provided.

BRIEF DESCRIPTION OF THE DRAWING(S)

DESCRIPTION OF THE PREFERRED EMBODIMENT(S)

An embodiment of a headrest support device of the present invention is described in the following with reference to the appended drawings. The headrest support device of the present embodiment is configured to be used for attaching a headrest to a seatback of a vehicle seat.

Figure 1:
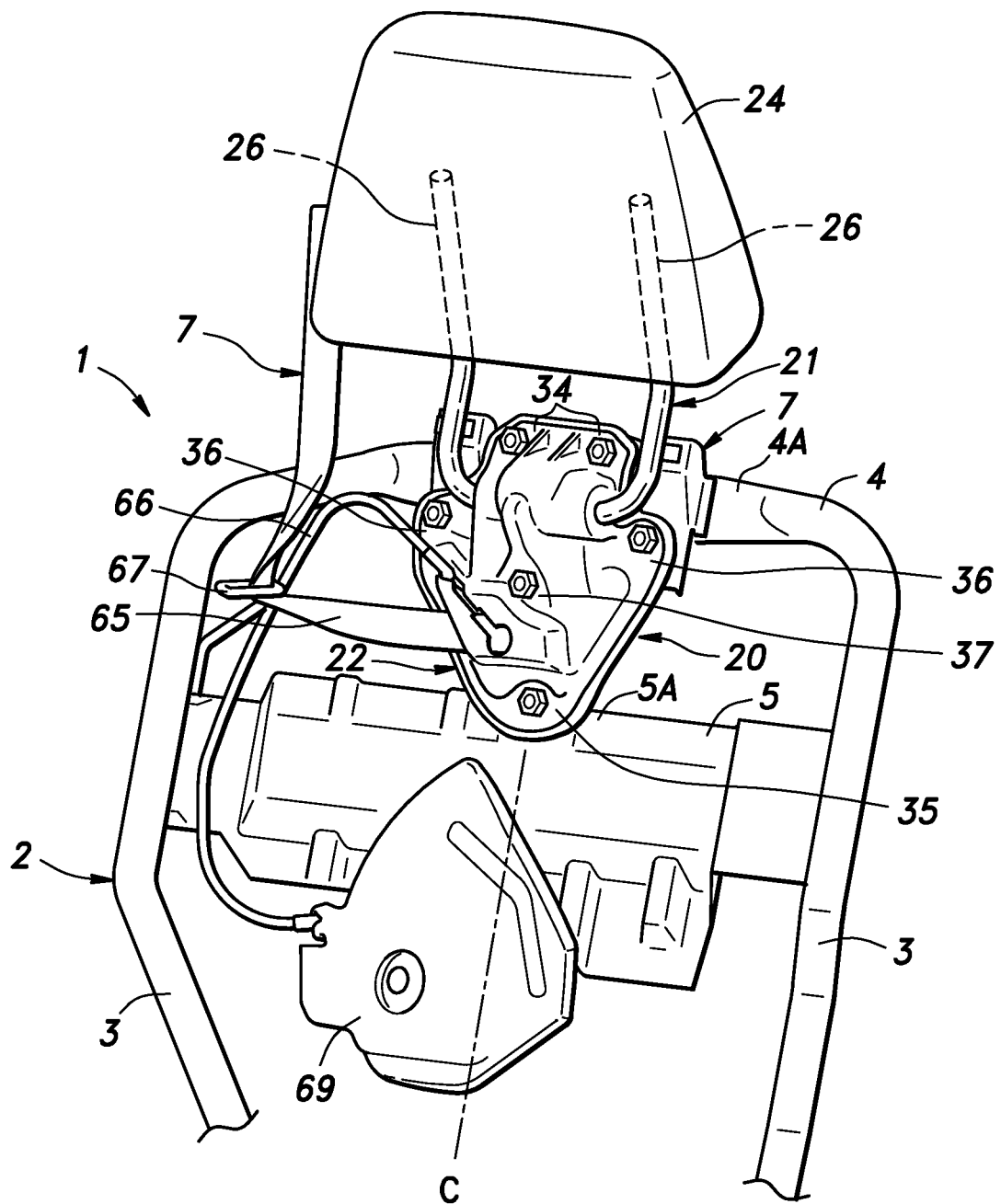
FIG. 1 is a front perspective view of a primary part of a vehicle seat provided with a headrest support device according to an embodiment of the present invention.

As shown in FIG. 1, a seatback 1 is formed by covering a seatback frame 2 consisting of a skeletal frame structure with a pad material and a skin member. The seatback frame 2 includes a pair of left and right side frames 3 extending vertically, a first upper frame 4 connected between the upper ends of the respective side frames 3, a second upper frame 4 connected between the two side frames 3 under the first upper frame 4. The upper portions of the left and right side frames 3 and a frame main body portion 4A of the first upper frame 4 are formed of a single continuous bent pipe member. A front side of a laterally central part of the frame main body portion 4A of the first upper frame 4 is deformed so as to define a flat surface facing forward.

As shown in FIGS. 1 to 4, a pair of right and left first brackets 7 are welded to the flat surfaces of the frame main body portion 4A, respectively, in a symmetric arrangement with respect to a vertical center line passing through the center of the frame main body portion 4A. Each first bracket 7 is provided with a front side portion 7A facing the front, and a left and a right side portion 7B extending rearward from the respective lateral edges of the front side portion 7A so that the first bracket 7 has a channel cross section having an open side facing rearward. Each first bracket 7 is attached to the first upper frame 4 at the rear edges of the left and right side portions 7B. Each first bracket 7 extends upward and downward with respect to the first upper frame 4. An upper portion 7C of the front side portion 7A of each first bracket 7 protrudes forward with respect to a lower portion 7D thereof.

Figure 4:
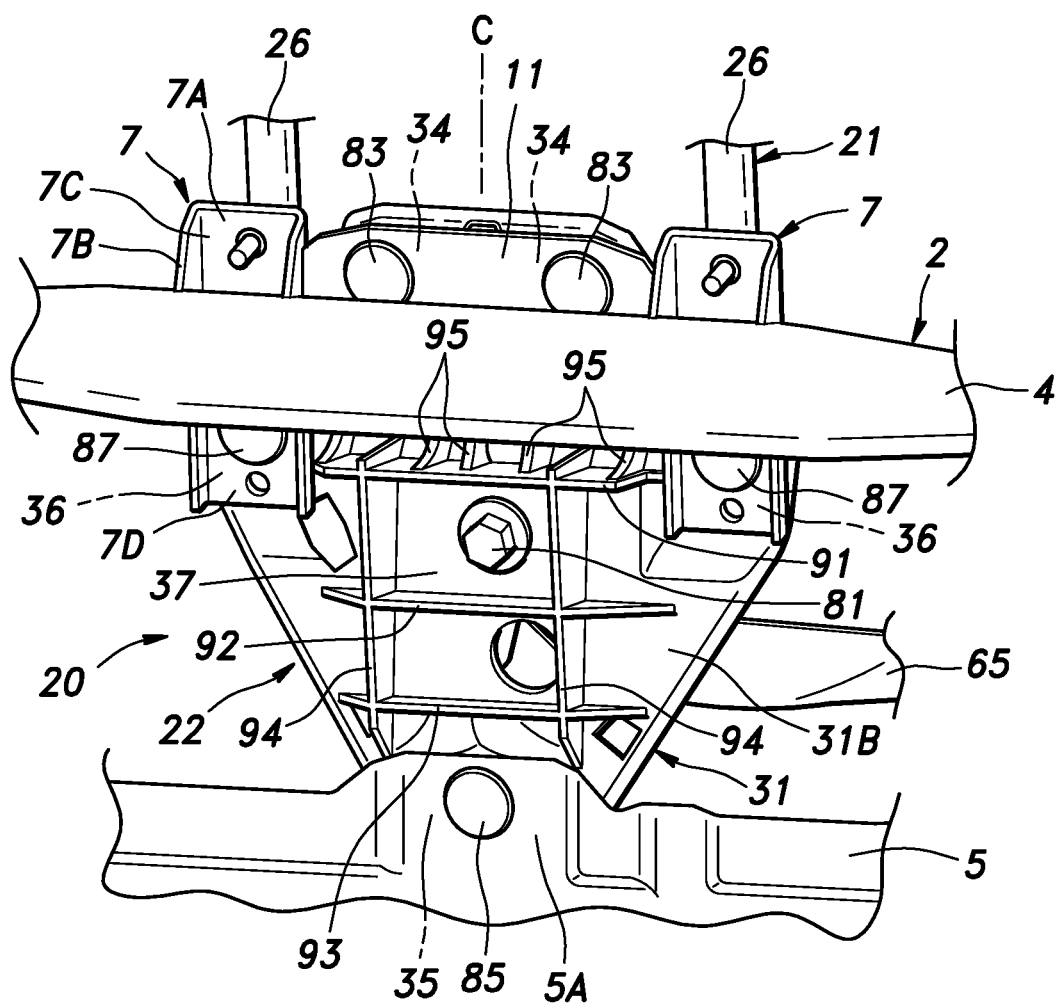
FIG. 4 is a rear perspective view of a primary part of the vehicle seat provided with the headrest support device.
Figure 5:
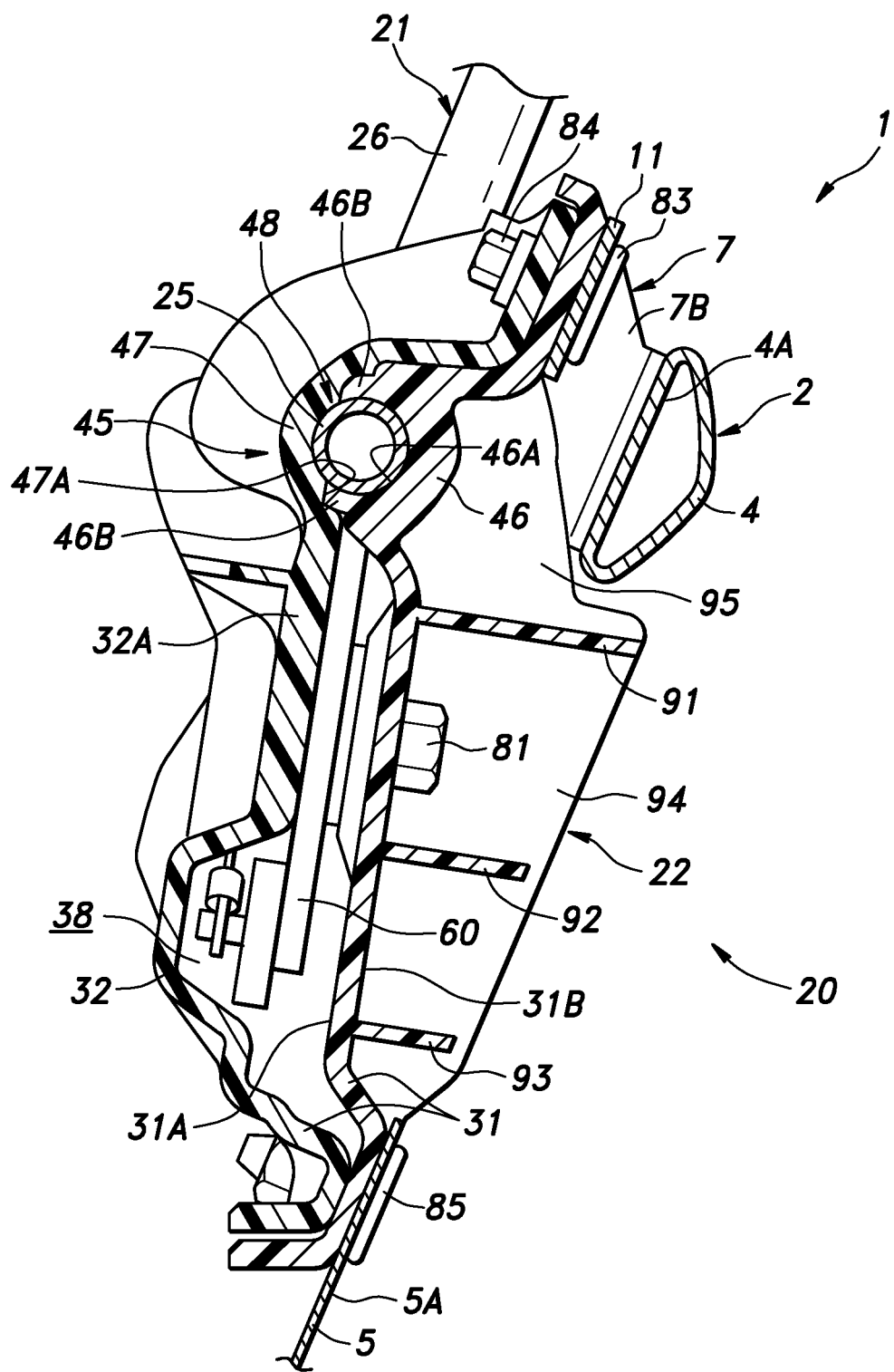
FIG. 5 is a sectional view taken along line V-V of FIG. 2.
Figure 6:
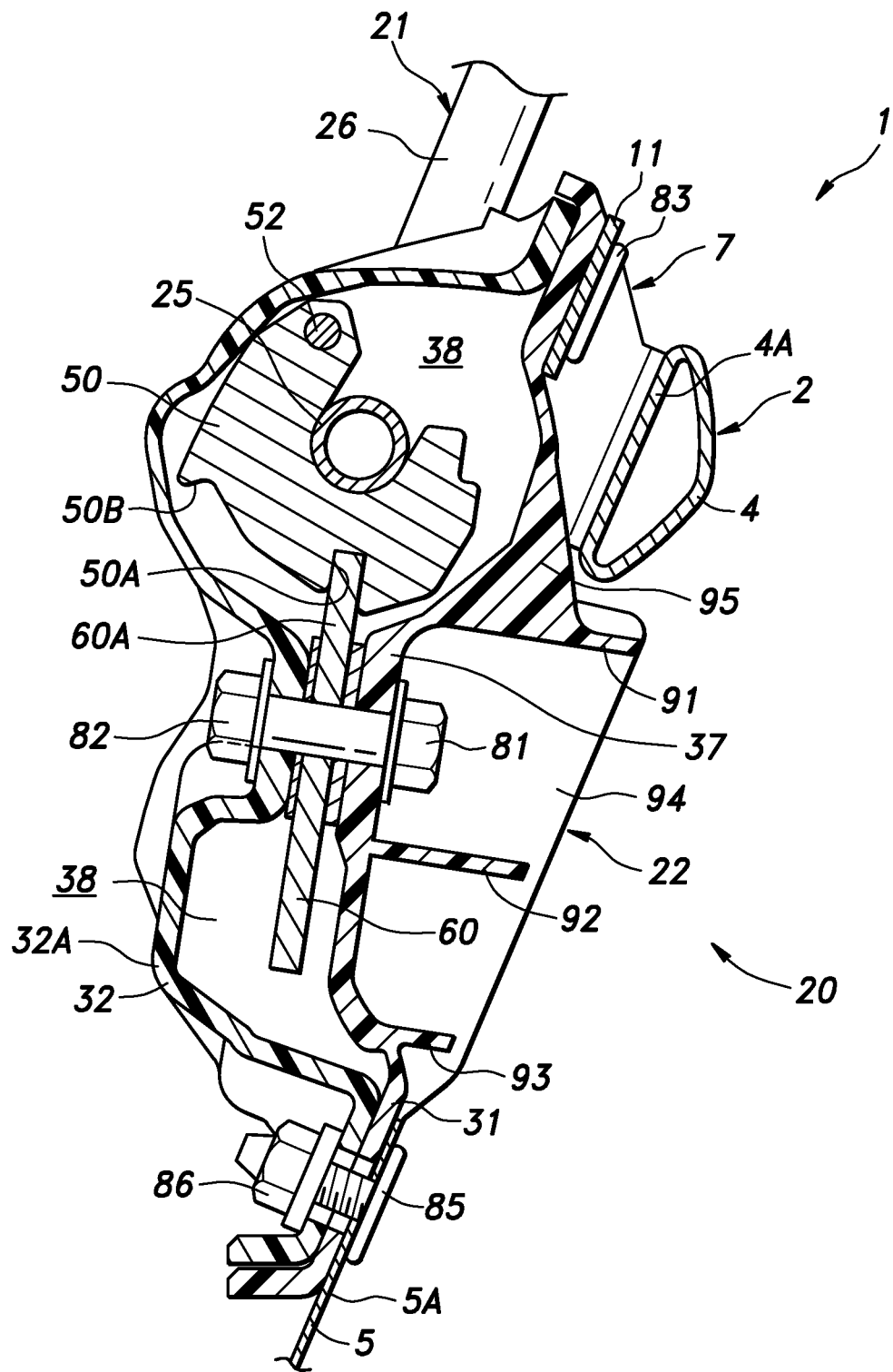
FIG. 6 is a sectional view taken along line VI-VI of FIG. 5.

As shown in FIGS. 4 to 6, a second bracket 11 extends between the two first brackets 7. The second bracket 11 has a plate shape having a major plane facing the fore and aft direction, and the left and right ends are welded to the corresponding side portions 7B of the respective first brackets 7. The second bracket 11 is spaced from the frame main body portion 4A in the forward direction, and projects upward beyond the upper edge of the frame main body portion A.

Figure 2:
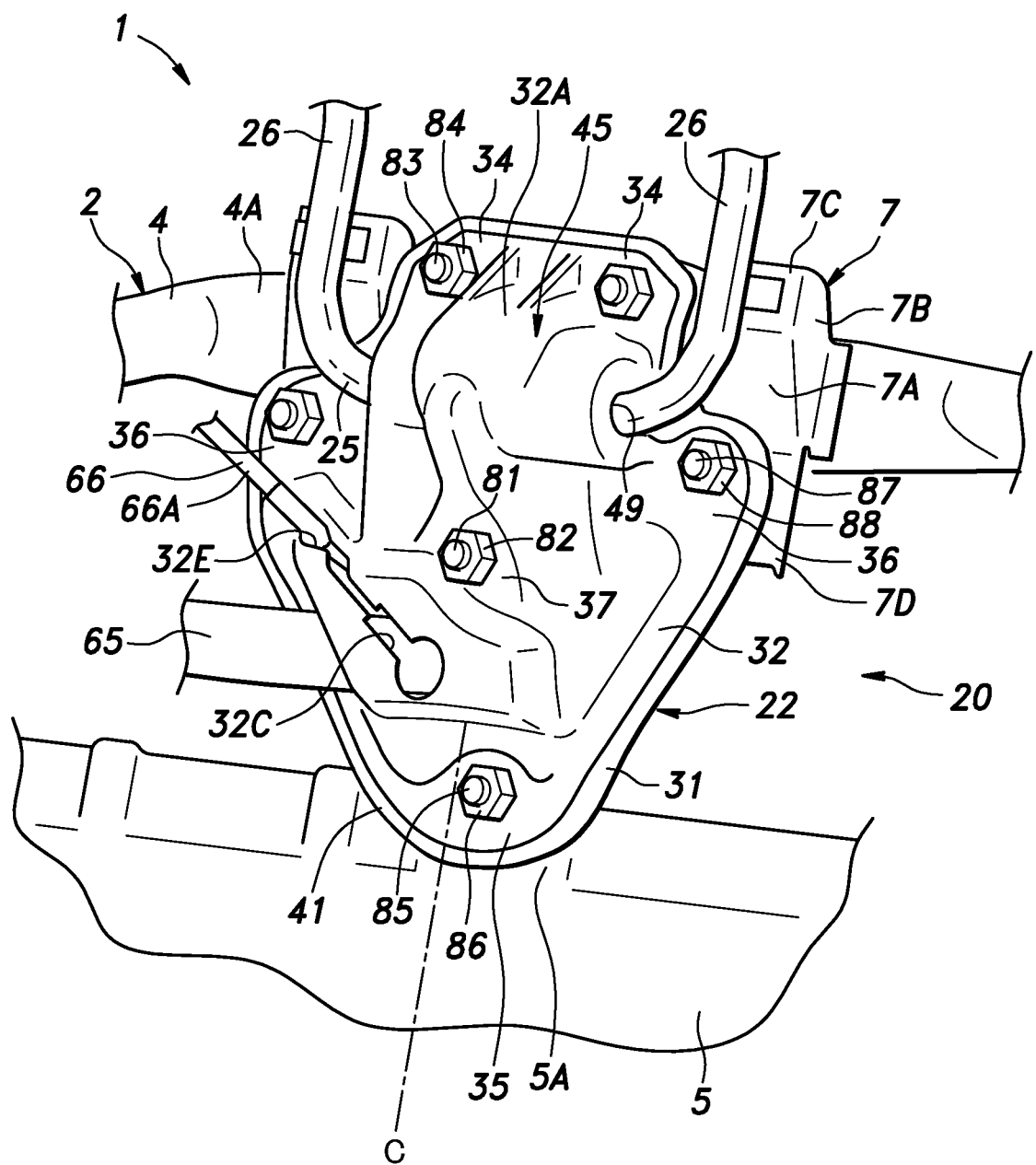
FIG. 2 is a front perspective view of the headrest support device.
Figure 3:
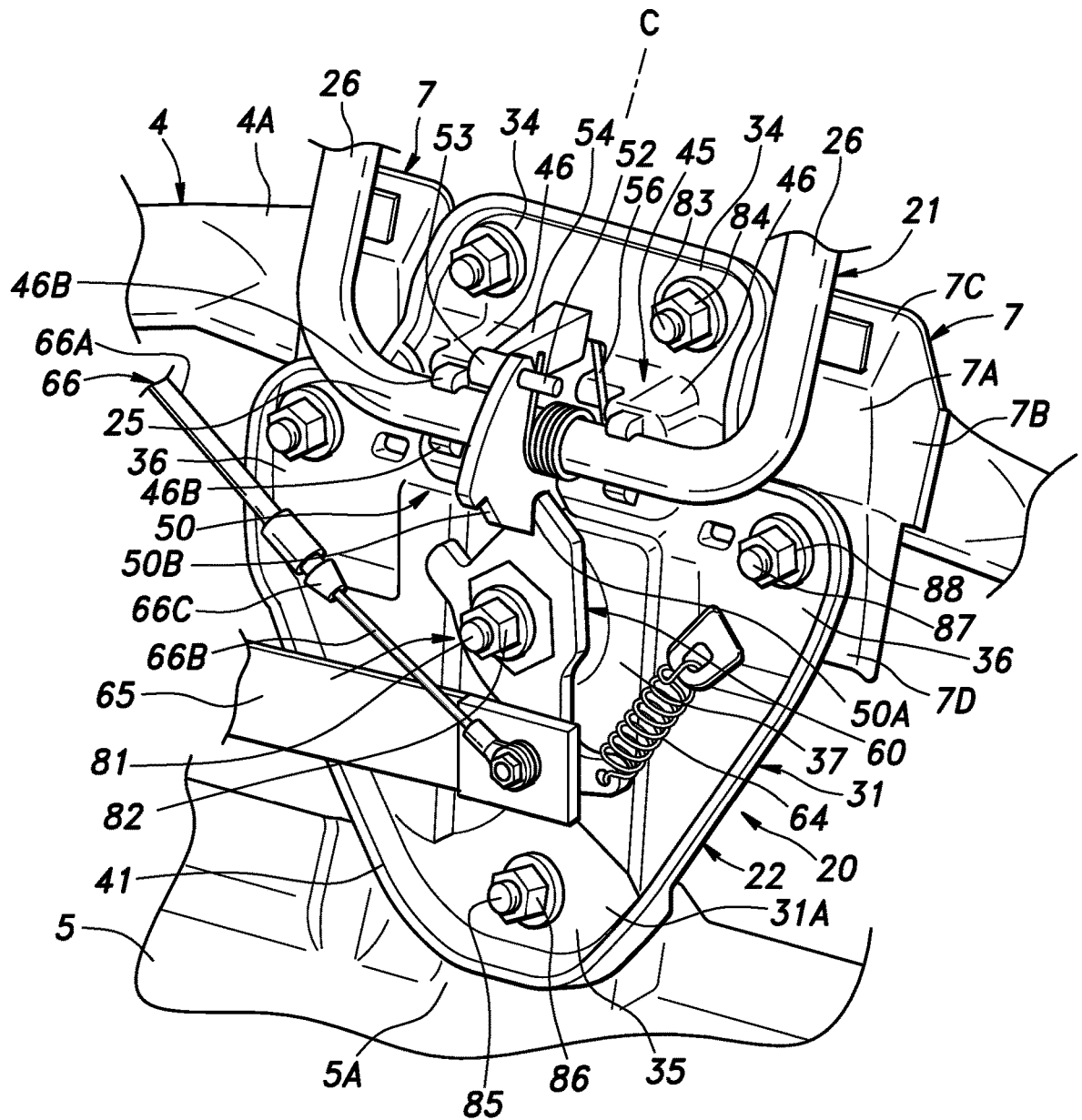
FIG. 3 is a front perspective view of the headrest support device with a second member removed.

As shown in FIGS. 1 to 3, the second upper frame 5 consists of a plate member having a major plane facing in the fore and aft direction. In order to increase the stiffness of the second upper frame 5, a plurality of beads are formed at appropriate parts thereof. A fastening seat 5A protruding forward is formed at a laterally central position of the second upper frame 5 adjacent to the upper edge thereof.

A headrest support device 20 includes a headrest pillar structure 21 and a support member 22 that rotatably supports the headrest pillar structure 21. In the present embodiment, the support member 22 is attached to the seatback frame 2, and the headrest pillar structure 21 is connected to a headrest 24.

The headrest pillar structure 21 includes a pillar base portion 25 extending in the lateral direction and a pair of right and left pillar main body portions 26 extending substantially in parallel with each other from the left and right end portions of the pillar base portion 25, respectively, and substantially in parallel to each other so that a shape of a letter U is substantially defined. The pillar base portion 25 and the left and right pillar main body portions 26 are formed by bending a single continuous metal rod or pipe member.

The support member 22 includes a first member 31 and a second member 32 that are combined to each other. Although various materials can be selected for the first member 31 and the second member 32, in the present embodiment, these two members are formed with plastic material. The first member 31 constitutes the rear side portion of the support member 22, and the second member 32 constitutes the front side portion of the support member 22. The first member 31 and the second member 32 abut each other at their respective edges. The first member 31 and the second member 32 are joined to each other at a pair of left and right first coupling portions 34, a second coupling portion 35, a pair of right and left third coupling portions 36, and a fourth coupling portion 37 as will be described hereinafter.

As shown in FIGS. 5 and 6, the central portion of the second member 32 forms a bulging portion 32A that bulges forward relative to the edge portion. Thus, owing to this bulging portion 32A, an internal space 38 is defined between the first member 31 and the second member 32. As shown in FIG. 2, the edge of the first member 31 protrudes outward beyond the edge of the second member 32. An edge rib 41 projecting forward extends along the edge of the first member 31. The end face of the edge portion of the second member 32 is disposed so as to abut on the inner side face of the edge rib 41.

As shown in FIGS. 2 to 4, the first member 31 and the second member 32 have the largest lateral width at the central portion with respect to the vertical direction, and the lateral width progressively decreases downward. Specifically, the lower portions of the first member 31 and the second member 32 are formed in a triangular shape that has one corner positioned under the other two corners in front view. The upper portions of the first member 31 and the second member 32 are formed in a laterally elongated, substantially rectangular shape in front view. The upper portions of the first member 31 and the second member 32 are narrower than the central portions thereof. The upper portion of the first member 31 is narrower than the distance between the inner surfaces of the left and right first brackets 7. The lateral widths of the intermediate portions of the first member 31 and the second member 32 are greater than the distance between the opposing inner surfaces of the left and right first brackets 7, and smaller than the distance between the outer surfaces of the left and right first brackets 7 facing away from each other.

As shown in FIGS. 3 and 5, a pair of bearing portions 45 are formed in a part of the internal space 38 defined between the first member 31 and the second member 32 intermediate between the upper end and the vertically central part of the internal space 38. Each bearing portion 45 is formed by a first bearing wall 46 projecting forward from the front surface 31A of the first member 31 and a second bearing wall 47 formed on the rear surface of the second member 32. The first bearing walls 46 and the second bearing walls 47 are formed on either side of a center line C passing vertically through the support member 22 in a symmetric manner. Each first bearing wall 46 abuts the corresponding second bearing wall 47 so as to jointly form a bearing hole 48. The left and right bearing holes 48 are aligned to a laterally extending axial line in a coaxial relationship. The pillar base portion 25 is received by the left and right bearing holes 48 and is supported so as to be rotatable around the laterally extending axial line.

A pair of resilient claws 469 having a suitable flexibility are formed on either side of a groove 46A which forms the rear half portion of the bearing hole 48 of each first bearing wall 46. The resilient claws 46B are configured to resiliently engage the pillar base portion 25 when received in the groove 46A. Thus, even when the second members 32 are not assembled to the first members 31, the pillar base portion 25 can be held received in the grooves 46A. The resilient claws 46B are configured to be deformed when the pillar base portion 25 is inserted into the grooves 46A in such a manner as to enable insertion of the pillar base portion 25 into the grooves 46A. Once the pillar base portion 25 is fully received in the grooves 46A, the resilient claws 46B are restored to their original shapes, and engage the outer circumference of the pillar base portion 25. Thus, the resilient claws 46B form parts of the bearing holes 48 that rotatably support the pillar base portion 25. Receiving recesses 47A configured to receive the resilient claws 46B are formed on the surfaces of the second bearing walls 47 that abut the respective first bearing walls 46.

As shown in FIG. 2, the bulging portion 32A of the second member 32 is provided with cutout portions 49 on either side portion thereof to pass the corresponding ends of the pillar base portion 25 therethrough. Each cutout portion 49 is elongated in the fore and aft direction, and the front end thereof is closed while the rear end thereof extends to and through the rear edge of the second member 32. The front end of the cutout portion 49 is formed in a semicircular shape when viewed in side view so as to conform to the opposing outer peripheral surface of the pillar base portion 25. The cutout portion 49 cooperates with the front surface 31A of the first member 31 to form a closed slot.

As shown in FIG. 3 and FIG. 6, a pillar side locking member 50 is provided in a part of the pillar base portion 25 located between the right and left first bearing walls 46. The pillar side locking member 50 is formed by a plate member having a major plane facing laterally, and is fixedly secured to the pillar base portion 25 by welding or the like. The pillar side locking member 50 is positioned on the center line C of the pillar base portion 25. A first locking notch 50A and a second locking notch 50B are formed on the outer peripheral portions of the pillar side locking member 50. The first locking notch 50A and the second locking notch 50B are respectively passed through the pillar side locking member 50 in the lateral direction, and open outward in the radial direction around the pillar base portion 25.

A pin 52 projects laterally from the pillar side locking member 50 on either side in parallel with the pillar base portion 25. A cushioning material 53 is fitted onto one end of the pin 52. The cushioning material 53 may be formed of a flexible material such as rubber and formed in a tubular shape so as to cover the end of the pin 52. A first stopper 54 protrudes forward from the front surface 31A of the first member 31, and opposes the one end of the pin 52. The one end of the pin 52 abuts against the first stopper 54 via the cushioning material 53 so that the limit of the rearward pivoting movement of the headrest pillar structure 21 (clockwise rotation around the pillar base portion 25 as seen from the left side) thereof is defined. The cushioning material 53 absorbs the impact when the pin 52 hits the first stopper 54 so that the generation of undesired noises can be avoided, and the handling impression can be improved. When the one end of the pin 52 abuts against the first stopper 54 via the cushioning material 53, the headrest pillar structure 21 is in the upright position (use position), and the pillar main body portion 26 extends upward from the pillar base portion 25.

The forward limit position of the pivoting movement of the headrest pillar structure 21 (counterclockwise rotation around the pillar base portion 25 as viewed from the left) is defined such that the abutting of the pillar side locking member 50 onto a second stopper (not shown in the drawings) formed on the front surface 31A of the first member 31. When the pillar side locking member 50 abuts against the second stopper, the headrest pillar structure 21 is in the retracted position (unused position), and the pillar main body portions 26 extend forward from the pillar base portion 25. The headrest pillar structure 21 is thus rotatable between the upright position and the retracted position.

A first biasing member 56 is provided between the headrest pillar structure 21 and the first member 31 for biasing the headrest pillar structure 21 toward the retracted position with respect to the first member 31. In the present embodiment, the first biasing member 56 consists of a torsion coil spring, and includes a coil portion supported by the pillar base portion 25, one end engaged by the other end of the pin 52, and another end engaged by the front surface 31A of the first member 31.

A support member side locking member 60 is rotatably provided on a central part of the front surface 31A of the first member 31 located below the bearing portions 45. The support member side locking member 60 is formed by a plate member having a major plane facing in the fore and aft direction, and is rotatably supported on the outer circumferential surface of a bolt 81 passed through the first member 31 and the second member 32 in the thickness wise direction (fore and aft direction). As will be described hereinafter, the bolt 81 is passed through a bolt insertion holes (not shown in the drawings) formed in the first member 31 and the second member 32 at a fourth coupling portion 37 from the rear to the flout, and a nut 82 is fastened on the bolt 81 so as to securely join the first member 31 and the second member 32 to each other. The bolt 81 is positioned on the center line C of the support member 22.

A locking piece 60A extends outward from an outer peripheral part of the support member side locking member 60 in a radial direction with respect to the bolt 81. The support member side locking member 60 is rotatable around the bolt 81 between an engaged position where the locking piece 60A is positioned in the first locking notch 50A or the second locking notch 50B and a disengaged position where the locking piece 60A is displaced from the first locking notch 50A and the second locking notch SOB. The first member 31 is provided with abutting portions (not shown in the drawings) that abut the support member side locking member 60 when the support member side locking member 60 is in the engaged position and the disengaged position. By the abutting of the support member side locking member 60 against either abutting portion, the rotational range of the support member side locking member 60 with respect to the first member 31 is determined.

A second biasing member 64 is provided between the support member side locking member 60 and the first member 31 for biasing the support member side locking member 60 toward the engaged position with respect to the first member 31. In the present embodiment, the second biasing member 64 consists of a tension coil spring that has one end engaged to the support member side locking member 60 and the other end engaged to the front surface 31A of the first member 31.

A first operation member 65 and a second operation member 66 are coupled to the support member side locking member 60. The first operation member 65 consists of a belt member made of a woven fabric or the like. The second operation member 66 consists a control cable having a guide sleeve 66A and a cable 66B slidably received in the guide sleeve 66A. One end of the first operation member 65 and one end of the cable 66B of the second operation member 66 are rotatably coupled to an outer peripheral part of the support member side locking member 60. For example, a support shaft protrudes from an outer peripheral part of the support member side locking member 60, and the one end of the first operation member 65 and the one end of the cable 66B of the second operation member 66 are rotatably supported by the support shaft. A stopper member such as a push nut may be attached to the free end of the support shaft.

As shown in FIG. 2, the second member 32 is provided with an opening (not shown in the drawings) through which the first operation member 65 passes and an elongated opening 32C through which the cable 66B of the second member 32 passes. One end of the opening 32C is disposed in a part opposing the junction at which the first operation member 65 and the cable 66B are connected to the support member side locking member 60, and is provided with a greater width than the remaining part of the opening 32C. Thus, when connecting the first operation member 65 and the cable 66B to the support member side locking member 60, the tool or the like is accessible to the support member side locking member 60 via the opening 32C. An engagement slot 32E for engaging a locking member 66C provided at the end portion of the guide sleeve 66A is formed on the front side of the second member 32.

As shown in FIG. 1, the other end of the first operation member 65 is passed through an annular guide member 67 attached to the side frame 3, and then through the pad material and the skin member of the seatback 1 before extending out of the seatback 1. By pulling the outer end of the first operation member 65 against the biasing force of the second biasing member 64, the vehicle occupant can displace the support member side locking member 60 from the engaged position to the disengaged position. The other end of the cable 66B of the second operation member 66 is connected to the output end of a link mechanism 69. The link mechanism 69 is connected to a reclining mechanism that rotatably supports the seatback 1 with respect to the seat cushion, for example, and is configured to operate the second operation member 66 according to the operation state of the reclining mechanism. For example, it may be configured such that when the reclining mechanism is unlocked, the link mechanism 69 pulls the second operation member 66 against the biasing force of the second biasing member 64 to displace the support member side locking member 60 from the engaged position to the disengaged position. The link mechanism 69 may be supported by the second upper frame 5.

As shown in FIGS. 2 and 3, the first member 31 and the second member 32 are joined to each other at a pair of first coupling portions 34 located on either lateral side of the upper end part of the first member 31 and the second member 32, a second coupling portion 35 located at the lower end part of the first member 31 and the second member 32, a pair of third coupling portions 36 located on either lateral side of the central part of the first member 31 and the second member 32, and a fourth coupling portion 37 positioned at the center of the first member 31 and the second member 32.

In the fourth coupling portion 37, the bolt 81 is passed through bolt insertion holes (not shown in the drawings) formed in the first member 31, the second member 32, and the support member side locking member 60, and the nut 82 is fastened to the bolt 8 to join the first member 31 and the second member 32 to each other. The first member 31 and the second member 32 are joined to each other by being joined at the fourth coupling portion 37. Before the support member 22 is attached to the seatback frame 2, the first member 31 and the second member 32 are joined to each other at the fourth coupling portion 37. The fourth coupling portion 37 is positioned at the center of the first member 31 and the second member 32 and on the center line C.

The first coupling portions 34 are located above the bearing portions 45 of the first member 31 and the second member 32, and symmetrical to each other with respect to the center line C. In addition, the first coupling portions 34 are located directly above the first bearing wall 46.

The first coupling portions 34 are arranged opposite to the second bracket 11. In each first coupling portion 34, a bolt 83 is passed into bolt insertion holes (not shown in the drawings) passed through the first member 31, the second member 32 and the second bracket 11 in the thickness-wise direction (the fore and aft direction), and a nut 84 is threaded onto the bolt 83 so that the first member 31, the second member 32 and the second bracket 11 are joined to each other by fastening the nut 84, in other words, the first member 31, the second member 32 and the second bracket 11 are fastened together by the bolts 83 and the nuts 84. The first coupling portions 34 are arranged above the first upper frame 4.

The second coupling portion 35 is located on the center line C below the fourth coupling portion 37 (the support member side locking member 60) of the first member 31 and the second member 32.

The second coupling portion 35 is located opposite to the fastening seat 5A of the second upper frame 5. In the second coupling portion 35, a bolt 87 is passed into bolt insertion holes (not shown in the drawings) passed through the first member 31, the second member 32 and the fastening seat 5A in the thickness-wise direction (in the fore and aft direction), and a nut 88 is threaded onto the bolt 87 so that the first member 31, the second member 32 and the fastening seat 5A are joined to one another, in other words, the first member 31, the second member 32 and the fastening seat 5A are fastened together by the bolt 87 and the nut 88.

The third coupling portions 36 are located below the bearing portions 45 of the first member 31 and the second member 32 and above the fourth coupling portion 37 symmetrical to each other about the center line C. Further, the third coupling portions 36 are disposed further outside than the respective first bearing walls 46.

The third coupling portions 36 are located opposite to the lower portion 7D of the first bracket 7. In each third coupling portion 36, a bolt 87 is passed into a bolt insertion hole (not shown in the drawings) passed through the first member 31, the second member 32, and the first bracket 7 in the thickness-wise direction (the fore and aft direction), and a nut 88 is threaded onto the bolt 87 so that the first member 31, the second member 32 and the first bracket 7 are fixedly attached to one another by fastening the nut 88. In other words, the first member 31, the second member 32 and the first bracket 7 are fastened together by the bolts 87 and the nuts 88. The third coupling portions 36 are arranged below the first upper frame 4.

As shown in FIGS. 4 to 6, the rear surface 31B of the first member 31 is formed with ribs projecting rearward which include a first to a third horizontal rib 91 to 93 extending in the lateral direction, a pair of vertical ribs 94 extending vertically, and a plurality of abutting ribs 95. The first horizontal rib 91 is positioned between the lower edge of the frame main body portion 4A of the first upper frame 4 and the fourth coupling portion 37. The second and third horizontal ribs 92, 93 are positioned between the fourth coupling portion 37 and the second coupling portion 35 in a mutually vertically spaced apart relationship. The vertical ribs 94 are positioned on either side of the fourth coupling portion 37 while the lower ends of the vertical ribs 94 extend to the upper edge of the second upper frame 5. The second and third horizontal ribs 92 and 93 and the two vertical ribs 94 intersect each other. The first and second horizontal ribs 91 and 92 and the vertical ribs 94 are disposed so as to surround the fourth coupling portion 37.

The lateral ends of the first horizontal rib 91 extend to the respective first brackets 7. The abutting ribs 95 extend upward from the upper side surface of the first horizontal rib 91 on the rear surface 31B of the first member 31. The projecting ends of the abutting ribs 95 are formed so as to conform to the outer shape of the first upper frame 4 in a complementary manner, and are in contact with the outer surface of the first upper frame 4. Preferably, the projecting length of each abutting rib 95 gradually decreases toward the upper end thereof.

As shown in FIG. 1, the free ends of the pillar main body portions 26 are inserted into the headrest 24 and retained to the headrest 24. The headrest 24 may have, for example, a support structure, a pad material and a skin member covering the support structure, and a pair of tubular pillar retaining structures provided in the support structure for receiving the respective pillar main body portions 26. One of the pillar retaining structures may be provided with a locking member configured to selectively engage the pillar main body portion 26 so that the insertion length of the pillar main body portions 26 in the respective pillar holding portions may be adjusted.

The effect of the headrest support device 20 configured as described above is discussed in the following. In this headrest support device 20, since the first coupling portion 34 is positioned in the space surrounded by the headrest pillar structure 21 in front view when the headrest is in use position, the support member 22 and the headrest pillar structure 21 are arranged in a compact manner, and the headrest support device 20 can be made compact in size.

Since the support member 22 is joined to the seatback frame 2 at the first to third coupling portions 34 to 36 ranging both vertically and horizontally, the headrest support device 20 can be supported on the seatback frame 2 in a highly stable manner. In particular, since the support member 22 is coupled to the first upper frame 4 at the first and third coupling portions 34 and 36 and to the second upper frame 5 at the second coupling portion 35, the coupling portions can range vertically by a significant distance so that the headrest support device 20 can be supported on the seatback frame 2 in a particularly stable manner.

Furthermore, since the first and third coupling portions 34 and 36 are secured to the first bracket 7 and the second bracket 11 that extend upward and downward with respect to the first upper frame 4, the first coupling portions 34 and the third coupling portions 36 located on either side of the pillar base portion 25 are both secured to the first upper frame 4 so that the headrest support device 20 can be supported on the seatback frame 2 in a stable manner. Furthermore, since the first coupling portions 34 are disposed on either side of the pillar side locking member 50, or, in other words, the part where the load is transmitted from the headrest pillar structure 21 to the support member 22, the headrest support device 20 can be supported in a particularly stable manner.

Further, since the support member 22 abuts onto the first upper frame 4 at the plurality of abutting ribs 95, the headrest support device 20 can be supported on the seatback frame 2 in a stable manner.

Further, in the above described embodiment, it is preferable that the second coupling portion 35 is disposed on the vertical line passing through the pillar side locking member 50 in front view.

Since the second coupling portion 35 is arranged on the vertical line passing through the pillar side locking member 50 in front view, the support member 22 is enabled to support the load from the pillar side locking member 50 in an efficient manner.

The part of the support member 22 surrounding the bolt 81 to which the load from the headrest pillar structure 21 is applied via the pillar side locking member 50 and the support member side locking member 60 is reinforced by the first and second horizontal ribs 91 and 92 and the vertical ribs 94, deformation of the support member 22 is minimized. In particular, the load from the headrest pillar structure 21 is efficiently transmitted to the side of the first and second upper frames 4 and 5 via the vertical ribs 94.

Since the first member 31 and the second member 32 are fastened together by the bolts 83, 85 and 87 for connecting the support member 22 to the seatback frame 2 at the first to third coupling portions 34 to 36, the necessary number of the bolts can be minimized.

Since the pillar side locking member 50 and the support member side locking member 60 are disposed in the internal space 38 substantially enclosed by the first member 31 and the second member 32, the pad material can be positioned directly around the support member 22 so that no extra cover material is required to be placed on the support member 22. Thereby, the headrest support device 20 can be made simple in structure and compact in size.

The pillar base portion 25 is supported by the bearing holes 48 formed between the first member 31 and the second member 32 so as not to be detached from the support member 22. Therefore, the headrest pillar structure 21 can be supported on the support member 22 in a stable manner.

Further, by providing the resilient claws 46B on the first bearing walls 46, even when the first member 31 and the second member 32 are separated from each other, the first bearing walls 46 are enabled to keep the pillar base portion 25 held in position. As a result, the assembling work for the headrest support device 20 is facilitated. In addition, as the resilient claws 46B are received in the respective receiving grooves 47A, the bearing holes 48 can be defined jointly by the first and second bearing walls 46 and 47 by abutting the first and second bearing walls 46 and 47 to each other.

Since one end (pillar side abutting portion) of the pin 52 abuts onto the first stopper 54 (abutting portion on the side of the support member) so as to define the rotational range of the headrest pillar structure 21 relative to the support member 22 via the cushioning material 53, striking noises can be avoided, and use comfort can be improved.

Although the present invention has been described in terms of a preferred embodiment thereof, it is obvious to a person skilled in the art that various alterations and modifications are possible without departing from the spirit of the present invention.

Glossary of Terms

1: seatback
2: seatback frame
3: side frame
4: first upper frame
4A: frame main body portion
5: second upper frame
7: first bracket
11: second bracket
20: headrest support device
21: headrest pillar structure
22: support member
24: headrest
25: pillar base portion
26: pillar main body portion
31: first member
32: second member
34: first coupling portion
35: second coupling portion
36: third coupling portion
37: fourth coupling portion
38 inner space
45: bearing portion
46: first bearing wall
46B: resilient claw
47: second bearing wall
47A: receiving groove
48: bearing hole
50: pillar side locking member
52: shaft (pillar side abutting portion)
53: cushioning material
54: first abutting portion (support member side abutting portion)
60: support member side locking member
64: second biasing member
65: first operation member
66: second operation member
81, 83, 85, 87: bolt
91: first horizontal rib
92: second horizontal rib
93: third horizontal rib
94: vertical rib
95: abutting rib

The invention claimed is:

1. A headrest support device comprising:
a headrest pillar structure including a pillar base portion extending laterally and a pair of pillar main body portions extending substantially vertically from the pillar base portion substantially in parallel to each other in a mutually spaced apart relationship;
a support member including a first member and a second member combined to each other so as to defined an internal space therebetween, the internal space receiving the pillar base portion and the first member and the second member jointly forming a bearing hole supporting the pillar base portion rotatably;
a pillar side locking member fixedly attached to the pillar base portion and positioned in the internal space; and
a support member side locking member moveably attached to the support member and positioned in the internal space to selectively engage the pillar side locking member to fix a relative angle between the headrest pillar structure and the support member,
wherein one of the support member and the pillar main body portions is coupled to a seatback and the other of the support member and the pillar main body portions is coupled to a headrest,
the pillar side locking member has a pillar side abutting portion,
one of the first member and the second member has a support member side abutting portion abutting the pillar side abutting portion so as to define the rotational range of the headrest pillar structure relative to the support member, one of the pillar side abutting portion and the support member side abutting portion has a cushioning material having a flexibility, the pillar side abutting portion, the support member side abutting portion and the cushioning material are positioned in the internal space.

2. The headrest support device according to claim 1, wherein the first member has a first bearing wall and the second member has a second bearing wall, the first bearing wall and the second bearing wall abuts each other so as to jointly form the bearing hole.

3. The headrest support device according to claim 2, wherein the first bearing wall has a pair of resilient claws configured to resiliently engage the pillar base portion, the second bearing wall has receiving recesses configured to receive the resilient claws.

4. The headrest support device according to claim 1, wherein the first member and the second member are joined to each other at least two coupling portions located on either side of the pillar base portion.

5. The headrest support device according to claim 1, wherein the support member side locking member is rotatable between an engaged position where the support member side locking member engages the pillar side locking member and a disengaged position where the support member side locking member is displaced from the pillar side locking member, the support member side locking member is biased toward the engaged position by a biasing member, the support member side locking member is coupled to one end of an operation member, the other end of the operation member extending out of the support member.

6. The headrest support device according to claim 1, wherein the second member forms a bulging portion that bulges forward relative to the edge portion, the internal space is defined between the first member and the second member owing to the bulging portion.

7. The headrest support device according to claim 6, wherein the support member is connected to a seatback frame by a plurality of bolts fastening the first member and the second member.

8. The headrest support device according to claim 1, wherein the seatback includes a pair of left and right side frames extending vertically, a first upper frame connected between the upper ends of the respective side frames, a second upper frame connected between the two side frames under the first upper frame and a pair of right and left first brackets provided at the first upper frame, the support member is fastened to each of the brackets and the second upper frame.

9. The headrest support device according to claim 8, wherein the seatback further includes a second bracket extends between the first brackets, the support member is further fastened to the second bracket.

10. A vehicle seat comprising the headrest support device according to claim 1.

* * * * *